(12) United States Patent
Quadir et al.

(10) Patent No.: US 12,317,249 B2
(45) Date of Patent: May 27, 2025

(54) NETWORK NODE AND METHOD PERFORMED THEREIN FOR HANDLING BASEBAND RESOURCES

(71) Applicant: Telefonaktiebolaget LM Ericsson (publ), Stockholm (SE)

(72) Inventors: Ahmedul Quadir, Sollentuna (SE); Mats Johansson, Spånga (SE); Markus Norden, Knivsta (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 738 days.

(21) Appl. No.: 17/423,322

(22) PCT Filed: Jan. 16, 2019

(86) PCT No.: PCT/SE2019/050029
§ 371 (c)(1),
(2) Date: Jul. 15, 2021

(87) PCT Pub. No.: WO2020/149771
PCT Pub. Date: Jul. 23, 2020

(65) Prior Publication Data
US 2022/0124750 A1 Apr. 21, 2022

(51) Int. Cl.
*H04W 72/52* (2023.01)
*H04W 72/1263* (2023.01)

(52) U.S. Cl.
CPC ....... *H04W 72/1263* (2013.01); *H04W 72/52* (2023.01)

(58) Field of Classification Search
CPC ............. H04W 72/1263; H04W 72/52; H04W 72/1268; H04W 72/1273
See application file for complete search history.

(56) References Cited

U.S. PATENT DOCUMENTS 7,768,973 B2 * 8/2010 Zhu ................ H04W 72/569
370/344
9,253,681 B1 * 2/2016 Vivanco ............... H04L 5/0064
(Continued)

FOREIGN PATENT DOCUMENTS

| CN | 102695276 A | 9/2012 |
| CN | 108401517 A | 8/2018 |
| CN | 109196933 A | 1/2019 |

OTHER PUBLICATIONS

International Search Report and Written Opinion dated Sep. 10, 2019 in International Application No. PCT/SE2019/050029 (9 pages total).

*Primary Examiner* — Jay P Patel
*Assistant Examiner* — Shehab A Alawdi
(74) *Attorney, Agent, or Firm* — Rothwell, Figg, Ernst & Manbeck, P.C.

(57) ABSTRACT

Embodiments herein relate to a method performed by a network node (110), for handling baseband resources in a wireless communications network (100). The network node (110) estimates an uplink resource need f( . . . ) and a downlink resource need g( . . . ) for a future Transmission Time Interval i based on resource metrics from one or more previous Transmission Time Intervals. The network node (110) determines a resource division between uplink and downlink based on the estimated uplink and downlink resource needs. The network node (110) further schedules the uplink and downlink resources based on the determined resource division.

12 Claims, 10 Drawing Sheets

(56) References Cited

U.S. PATENT DOCUMENTS

| | | | |
|---|---|---|---|
| 2006/0019672 A1 | 1/2006 | Kolding et al. | |
| 2008/0192660 A1* | 8/2008 | Li | H04W 72/543 |
| | | | 370/294 |
| 2008/0259856 A1* | 10/2008 | Frederiksen | H04L 27/2602 |
| | | | 370/329 |
| 2010/0177675 A1* | 7/2010 | Ai | H04W 72/30 |
| | | | 370/312 |
| 2011/0134934 A1* | 6/2011 | Arroyo | H04L 47/781 |
| | | | 370/431 |
| 2013/0003579 A1* | 1/2013 | Lu | H04N 21/631 |
| | | | 370/252 |
| 2013/0136068 A1 | 5/2013 | Johansson et al. | |
| 2015/0351117 A1 | 12/2015 | Rahman et al. | |
| 2017/0171850 A1* | 6/2017 | Ang | H04L 5/0055 |
| 2018/0124764 A1 | 5/2018 | Lee | |
| 2018/0324823 A1* | 11/2018 | Martin | H04W 72/23 |
| 2019/0320418 A1* | 10/2019 | Ko | H04W 72/04 |

\* cited by examiner

NETWORK NODE AND METHOD PERFORMED THEREIN FOR HANDLING BASEBAND RESOURCES

CROSS REFERENCE TO RELATED APPLICATIONS

This application is a 35 U.S.C. § 371 National Stage of International Patent Application No. PCT/SE2019/050029, filed Jan. 16, 2019.

TECHNICAL FIELD

Embodiments herein relate to a network node and a method performed therein for handling baseband resources.

BACKGROUND

In a typical wireless communication network, wireless devices, also known as wireless communication devices, mobile stations, stations (STA) and/or User Equipment (UE), communicate via an access Network such as a Radio Access Network (RAN) with one or more core networks (CN) or a Wi-Fi network. The RAN covers a geographical area which is divided into service areas or cell areas, which may also be referred to as a beam or a beam group, with each service area or cell area being served by a radio network node such as a radio access node e.g., a radio base station (RBS) or a Wi-Fi access point, which in some networks may also be denoted, for example, a NodeB, eNodeB (eNB), or Next Generation NodeB (gNB) as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE or gNBs in 5G, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Scheduling is a very important functionality of evolved NodeB, such as e.g. eNB and/or gNB in LTE/NR or any mobile communications technology. Scheduling allows for efficient accommodation of UEs over time-frequency resources for data transmission. Scheduling is done for Downlink (DL) and Uplink (UL) transmission. Scheduler implementation is network provider specific.

Bandwidth is a limited resource and often very expensive, and it is therefore important to utilize the bandwidth efficiently.

In LTE an LTE Base Band (BB) unit is typically serving multiple cells by a static deployment of uplink (UL) and downlink (DL) layer 1 (L1) processing. The static hardware (HW) resource deployment is easy to maintain but limited by a number of physical confines such as maximum throughput, a number of scheduled entities (SE) per Transmission Time Interval (TTI), a number of scheduled physical resource blocks and a number of connected users.

The main problem with having statically deployed processing resources is that the available processing resources are not efficiently used. For example, in case Time Division Duplex (TDD) is used in a DL subframe, the dedicated UL processing resources are not used.

Different operators may use different deployments of cells of different configurations. Furthermore, the traffic scenarios over time may vary. One operator may use very few cells whereas another operator may use a large number of cells. At some times during the day there may be very few users connected to a radio network node, such as an eNB or a gNB. In this case the demand for scheduling entities will be low, the demand for PRBs and throughput may however be high. A static processing resource deployment cannot utilize all of the available processing resources except for a very limited set of cases.

SUMMARY

It is an object of embodiments herein to enhance performance of the wireless communications network, in particular by providing a method for handling processing resources which more efficiently utilizes the available processing resources.

According to a first aspect of the embodiments herein the object is achieved by a method performed by a network node, for handling baseband resources in a wireless communications network. The network node estimates an uplink resource need f( . . . ) and a downlink resource need g( . . . ) for a future TTI i based on resource metrics from one or more previous TTIs. The network node determines a resource division between uplink and downlink based on the estimated uplink and downlink resource needs. The network node further schedules the uplink and downlink resources based on the determined resource division.

According to a second aspect of the embodiments herein the object is achieved by a network node, for handling baseband resources in a wireless communications network. The network node is configured to estimate an uplink resource need f( . . . ) and a downlink resource need g( . . . ) for a future TTI i based on resource metrics from one or more previous TTIs. The network node is configured to determine a resource division between uplink and downlink based on the estimated uplink and downlink resource needs. The network node is further configured to schedule the uplink and downlink resources based on the determined resource division.

According to a third aspect of the embodiments herein the object is achieved by a computer program product comprising instructions, which when executed by at least one processor, causes the at least one processor to perform the method according to the first aspect of embodiments herein.

According to a fourth aspect of the embodiments herein the object is achieved by a carrier comprising the computer program product according to the third aspect of embodiments herein, wherein the carrier is one of an electronic signal, an optical signal, an electromagnetic signal, a magnetic signal, an electric signal, a radio signal, a microwave signal, or a computer-readable storage medium.

The proposed solution provides a more efficient utilization of hardware resources which matches the requirements of the traffic pattern better. If e.g. the uplink momentarily needs more resources than it is allowed to use while the downlink needs less resources than it is allowed to use, the uplink may be throttled despite there being idle resources available which the downlink does not need and/or use. The proposed solution mitigates these problems by dynamically adjusting the amount of resources allowed for uplink and downlink respectively based on their needs while keeping the total amount of allowed resources fixed, thereby combining optimal hardware utilization with overload protection. This allows for higher data throughput.

BRIEF DESCRIPTION OF THE DRAWINGS

The embodiments herein will now be described and explained in more detail in relation to the enclosed drawings, in which.

DETAILED DESCRIPTION

Figure 1:
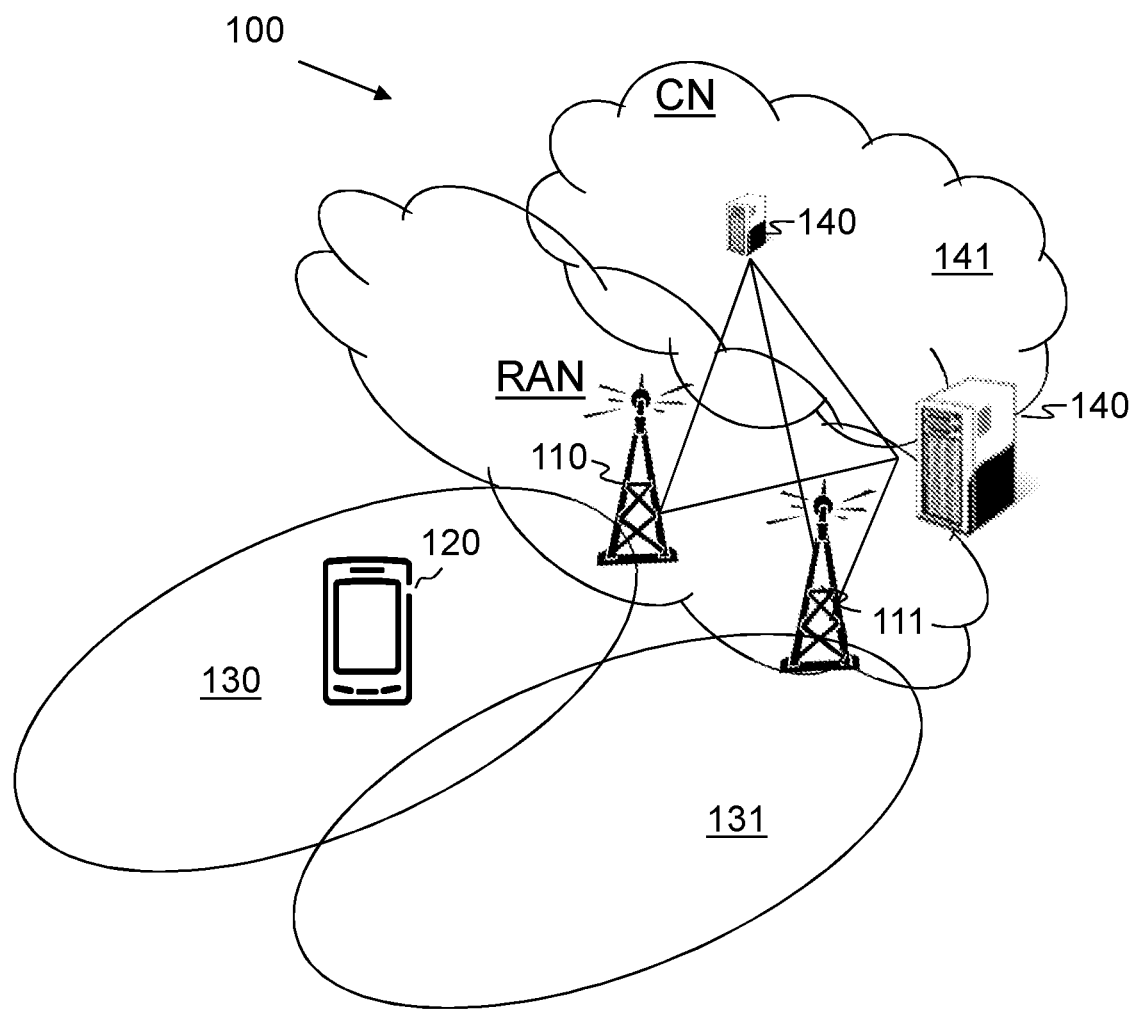
FIG. 1 is a schematic overview depicting a wireless communications network.

FIG. 1 depicts an example of a communications network 100 according to a first scenario in which embodiments herein may be implemented. The communications network 100 is a wireless communication network such as e.g. a 5G, LTE, E-Utran, WCDMA, GSM network, any 3GPP cellular network, Wimax, or any cellular network or system.

The communications network 100 comprises a Radio Access Network (RAN) and a Core Network (CN). The communication network 100 may use any of a number of different technologies, such as Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB), or Wi-Fi, just to mention a few possible implementations. In the communication network 100, one or more UEs 120 may communicate via one or more Access Networks (AN), e.g. RAN, with one or more CNs. The UE 120 may e.g. be a wireless device (WD), a mobile station, a non-access point (non-AP) STA, a STA, and/or a wireless terminal. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The RAN comprises a set of radio network nodes, including the two shown radio network nodes 110, 111 each providing radio coverage over one or more geographical areas, such as a cell 130, 131, using a radio access technology (RAT), such as 5G, LTE, UMTS, Wi-Fi or similar. The radio network node 110, 111 may be a radio access network node such as a radio network controller or an access point such as a wireless local area network (WLAN) access point or an Access Point Station (AP STA), an access controller, a base station, e.g. a radio base station such as a gNB, NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 110, 111 depending e.g. on the radio access technology and terminology used.

The CN further comprises a core network node 140 which is configured to communicate with the radio network nodes 110, 111, via e.g. an S1 interface. The core network node may e.g. be a Mobile Switching Centre (MSC), a Mobility Management Entity (MME), an Operations & Management (O&M) node, an Operation, Administration and Maintenance (OAM) node, an Operations Support Systems (OSS) node and/or a Self-Organizing Network (SON) node. The core network node 140 may further be a distributed node comprised in a cloud 141.

The UE 120 is located in the cell 130 of the network node 110, which is referred to as the serving cell, whereas the cell 131 of the network node 111 is referred to as a neighboring cell. Although, the network node 110 in FIG. 1 is only depicted providing radio coverage in a serving cell 130, the same network node 110 may further provide radio coverage in one or more neighboring cells 131 in addition to the serving cell 130.

The UE 120 may further be configured to communicate over a plurality of different RATs, such as 5G, LTE, UMTS, Wi-Fi or similar.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB, GSM network, any 3GPP cellular network or any cellular network or system, may also benefit from exploiting the ideas covered within this disclosure.

Hardware resources are not allocated exclusively for physical layer uplink processing, nor for physical layer downlink processing. Instead, the uplink and downlink share resources dynamically from a common pool of resources. In order not to exhaust that pool and create an overload situation, limitations may be imposed on the amount of resources consumed by each domain. These limitations may also be referred to as hardware utilization limitations. The limitations may be imposed by an entity, which may be referred to as a Baseband Resource Handler (BBRH). The entity may e.g. be or be comprised in the network node 110.

In order to utilize the hardware resources more efficiently, the hardware utilization limitations may reflect the uplink/downlink traffic pattern. If the limitations are set statically, the hardware utilization will in most cases be sub-optimal due to fluctuations of the traffic pattern. In some scenarios the uplink may require less resources than it has been statically allocated, while the downlink requires more resources than it has been statically allocated, or vice versa. The embodiments herein therefore introduce dynamic hardware utilization limits, where the balance between uplink and downlink is determined by a traffic pattern history during recent TTIs. The determination of the traffic pattern history may e.g. be performed using a slow filter, such as e.g. a Finite Impulse Response (FIR) or an Infinite Impulse Response (IIR) filter. The network node 110 may e.g. sample a number of previous TTIs, such as e.g. the two latest TTIs, and may determine a slope of the requested resources, i.e. the rate of change of the resources used by the uplink and/or the downlink between the two TTIs, and may use that to estimate future resource needs. It should be noted that the embodiments herein are not limited to sampling the two latest TTIs. Instead it is obvious to a person skilled in the art that the characteristics of the FIR and/or the IIR filter may be adapted to meet desired requirements, e.g. by changing the number of previous TTIs that are sampled. The term resource need shall herein be interpreted as the resources needed, which may also be referred to as desired, for transmitting data currently available for transmission in the UL or in the DL.

The embodiments herein may be performed by the network node 110 or a control plane entity, herein referred to as a BBRH, which is responsible for dividing the available processing resources between physical layer uplink processing and physical layer downlink processing. The control plane entity may be or may be comprised in the network node 110.

The following limitations may be taken into account by the network node 110 and/or the BBRH:

Resource trading between uplink and downlink on a TTI basis is not possible because the uplink scheduling decisions affecting resource consumption during a certain TTI are made several TTIs before the downlink scheduling decisions affecting resource consumption during the same TTI.

The rate of change of the resource division between uplink and downlink needs to be limited in order to avoid overestimation or overshooting of layer 1 (L1) processing.

Both the uplink and the downlink requires a minimum amount of available resources, i.e. resources which the uplink or downlink are allowed to use, regardless of traffic situation, in order not to starve out necessary channel processing, such as e.g. processing of Physical Downlink Control Channel (PDCCH), Physical Uplink Control Channel (PUCCH), Radio Access Control Channel (RACH), Master Information Block (MIB), System Information Block (SIB) and/or pagings.

Therefore, the embodiments herein provide resource division between downlink and uplink processing based on history, such as e.g. historical scheduling data. The embodiments herein may use a slow filter, such as e.g. a FIR or an IIR, for dynamic adaptation of the resource division between downlink and uplink based on traffic during previous TTIs.

The resource control may be based on the history of e.g.
the number of scheduling entities (SE) with PDCCH allocation in uplink and downlink per TTI,
the number of UEs 120 with data in their buffer in uplink and downlink,
the number of physical resource blocks used for uplink and downlink respectively in a TTI, and/or
a combined metric based on the metrics mentioned above and possibly also other relevant metrics.

The network node 110 and/or the BBRH predicts, which may also be referred to as estimates, an uplink resource need f( . . . ) and a downlink resource need g( . . . ), where f( . . . ) and g( . . . ) are dependent on the metrics mentioned above. Furthermore, f( . . . ) and g( . . . ) may not only depend on metrics for the current TTI but may also be based on data from previous TTIs. This may be achieved by means of a finite impulse response (FIR) or an infinite impulse response (IIR) filter.

Based on the predicted resource needs for the uplink and the downlink, the network node 110 may determine a predicted optimal uplink resource fraction $$N_i = \frac{f(\ldots)}{f(\ldots) + g(\ldots)}$$

for TTI i. In order to avoid large fluctuations, this optimal resource division may itself be filtered with a slow filter, such as e.g. the IIR or a FIR filter, to determine an filtered uplink resource fraction $M_i$ for the uplink in TTI i. The filtered resource fraction $M_i$ may also be referred to as an actual resource fraction or an actual resource allocation for the uplink. Furthermore, $M_i$ may be subject to restrictions applied after the filtering, in order not to starve out either domain, i.e. the uplink domain or the downlink domain, completely. $M_i$ may e.g. be restricted as $0<\alpha \leq M_i \leq \beta < 1$. Suitable values for the constants $\alpha$ and $\beta$ may be determined based on domain knowledge, such as e.g. processing costs on the different channels. By setting the upper limit $\beta$ of the actual resource fraction $M_i$ for the uplink, there will always be a minimum amount of resources available for the downlink. The minimum amount of resources available for the downlink will thus be $1-\beta$. Correspondingly, the lower limit ensures that a minimum amount of resources a is available for the uplink.

Figure 2:
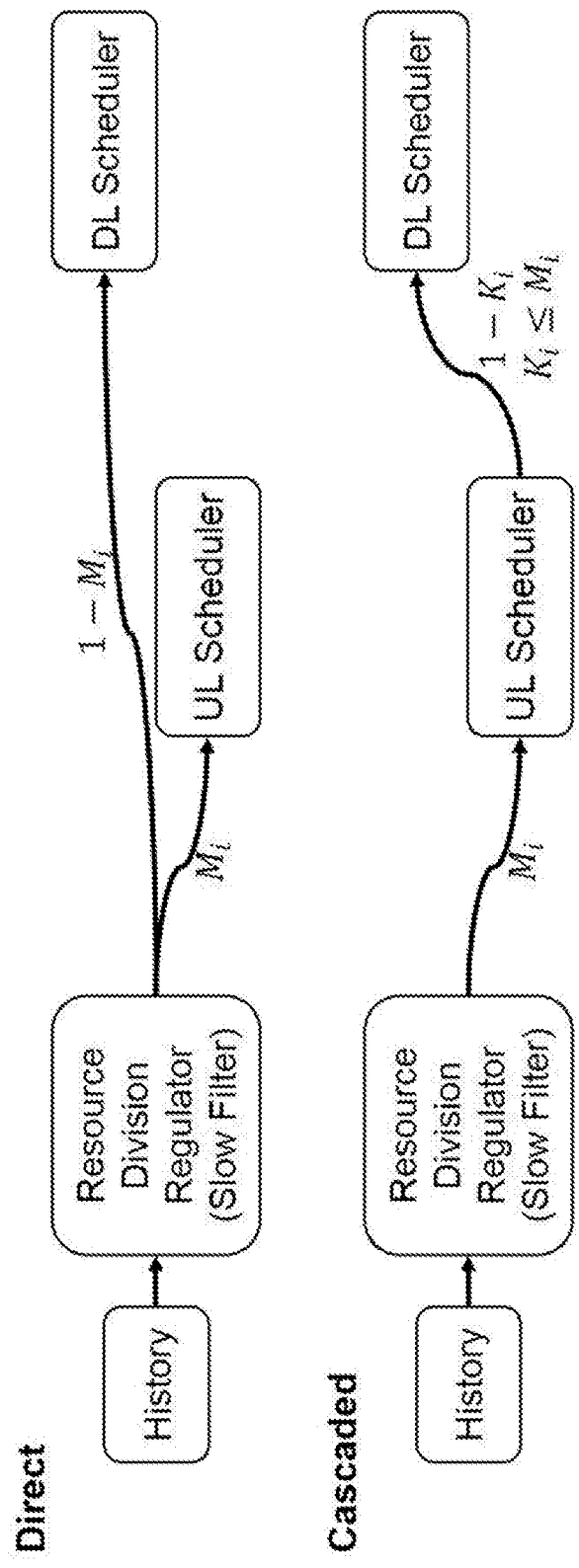
FIG. 2 is a schematic overview depicting two types of resource control according to the embodiments herein.

When the resource division between the uplink and the downlink has been decided, there are two options for applying the resource division, direct application and cascaded application. These two options are disclosed in FIG. 2.

Direct application: The uplink resource fraction $M_i$ may be used for the uplink and the remaining resource fraction $1-M_i$ is used for the downlink. Since $M_i$ is based on predictions, the amount of resources reserved for the uplink may be higher than the actual amount of resources needed if the traffic pattern changes rapidly.

With the direct application of the resource division some of the resources reserved for the uplink may be idle if the uplink does not need them even if the downlink would have needed them.

Cascaded application: The resource fraction $M_i$ is used for the uplink. The resource fraction $M_i$ may be used as an upper limit during the scheduling of uplink transmission. After all scheduling decisions for the uplink have been made, the actual resource consumption $K_i$ of the uplink may be determined by the network node 110. It shall be noted that $K_i \leq M_i$ since $M_i$ was used as an upper limit by the scheduler. This means that $1-K_i \geq 1-M_i$ and it is therefore beneficial to use $1-K_i$ as an upper limit on resource utilization when scheduling the downlink transmission since the resources reserved for but not used by the uplink will then be made available for downlink processing instead. In the cascaded version, any resources not used by the uplink physical channel will be made available to the downlink physical channel.

Figure 3:
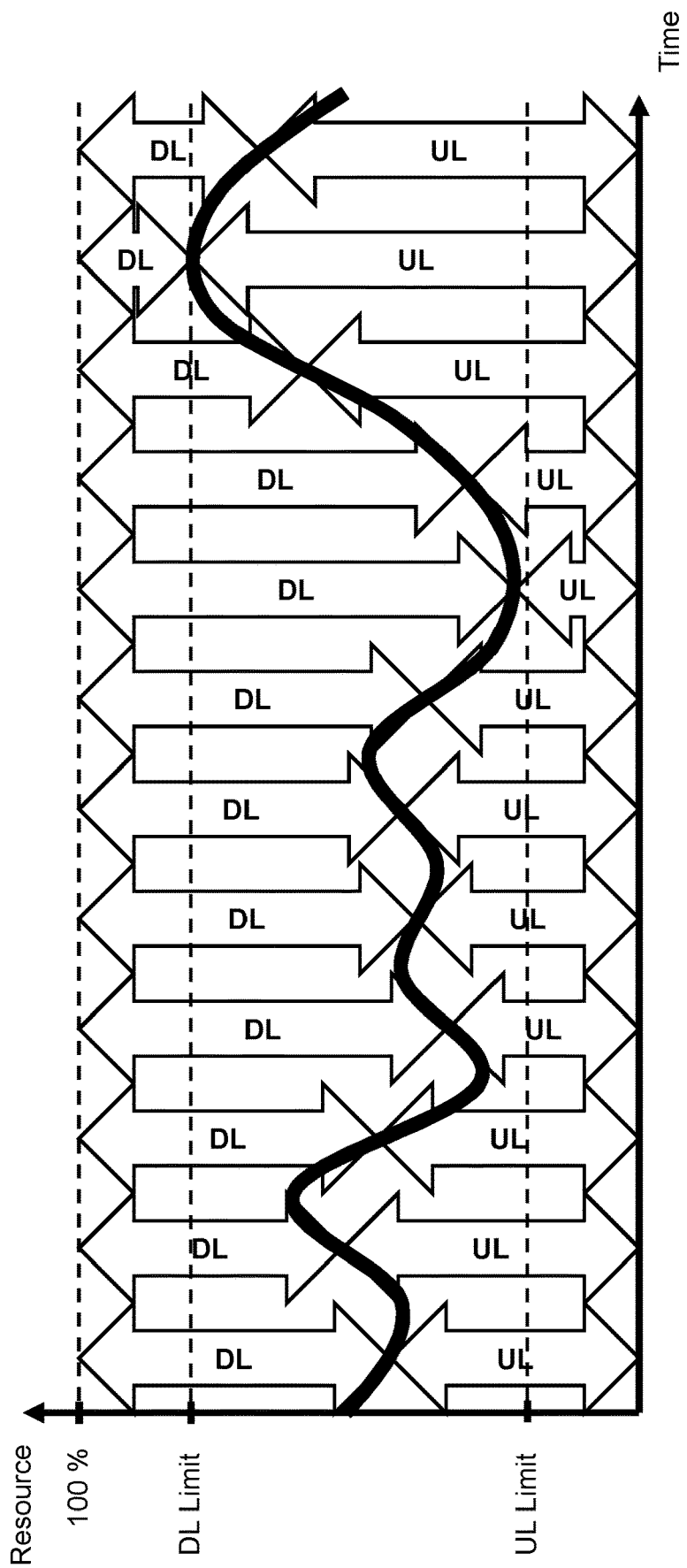
FIG. 3 is a schematic overview depicting a dynamic resource division between downlink and uplink according to the embodiments herein.

FIG. 3 discloses the dynamic resource division between the uplink physical channel and the downlink physical channel according to the embodiments herein. As can be seen in FIG. 3, the resource division varies over time based on the predicted resource needs. The lower limit α set for the uplink corresponds to the UL limit shown in FIG. 3, which provides a minimum amount of resources dedicated to the UL channel. The upper limit β set for the uplink corresponds to the DL limit shown in FIG. 3, which limits the maximum amount of resources that may be scheduled for the uplink and thereby provides a minimum amount of resources dedicated to the DL channel.

Some actions performed by the network node 110, for handling baseband resources in a wireless communications network 100, according to embodiments herein will now be described with reference to a flowchart depicted in FIG. 4. The actions in FIG. 4 do not have to be taken in the order stated below, but may be taken in any suitable order. Actions that should be performed in some embodiments only are marked with dashed boxes.

Action 4010: The network node 110 estimates an uplink resource need f( . . . ) and a downlink resource need g( . . . ) for a future TTI i based on resource metrics from one or more previous TTIs. A future TTI shall herein be interpreted as an upcoming TTI, i.e. a TTI later in time.

Action 4020: The network node 110 determines a resource division between uplink and downlink based on the estimated uplink and downlink resource needs f( . . . ) and g( . . . ). The resource division may be determined based on an optimal uplink resource fraction of the available resources, $$N_i = \frac{f(...)}{f(...) + g(...)},$$

for a TTI i.

The resource division may be further determined by applying upper and lower restrictions to the optimal uplink resource fraction of the available resources.

The resource division may be determined by filtering the optimal uplink resource fraction $N_i$ to determine the filtered resource fraction $M_i$ for the uplink in the TTI i. The resource fraction may also be referred to as a resource allocation. The filtering may be performed using a slow filter, such as e.g. an IIR or a FIR filter.

The downlink resource fraction may be determined as the remaining resources once the uplink resource fraction has been subtracted.

Action 4030: The network node 110 schedules the uplink and downlink resources based on the determined resource division.

The scheduling may comprise scheduling the uplink using the filtered resource fraction $M_i$ and scheduling the downlink using the remaining resources $1-M_i$.

The scheduling may also comprise using the filtered resource fraction $M_i$ as an upper limit for scheduling of the uplink. An actual resource consumption $K_i$ of the uplink may be determined after the uplink has been scheduled. The downlink may then be scheduled using the remaining resources $1-K_i$. The filtered resource fraction $M_i$ may be used as the upper limit which the uplink resources should be kept below when the uplink is scheduled.

Figure 4:
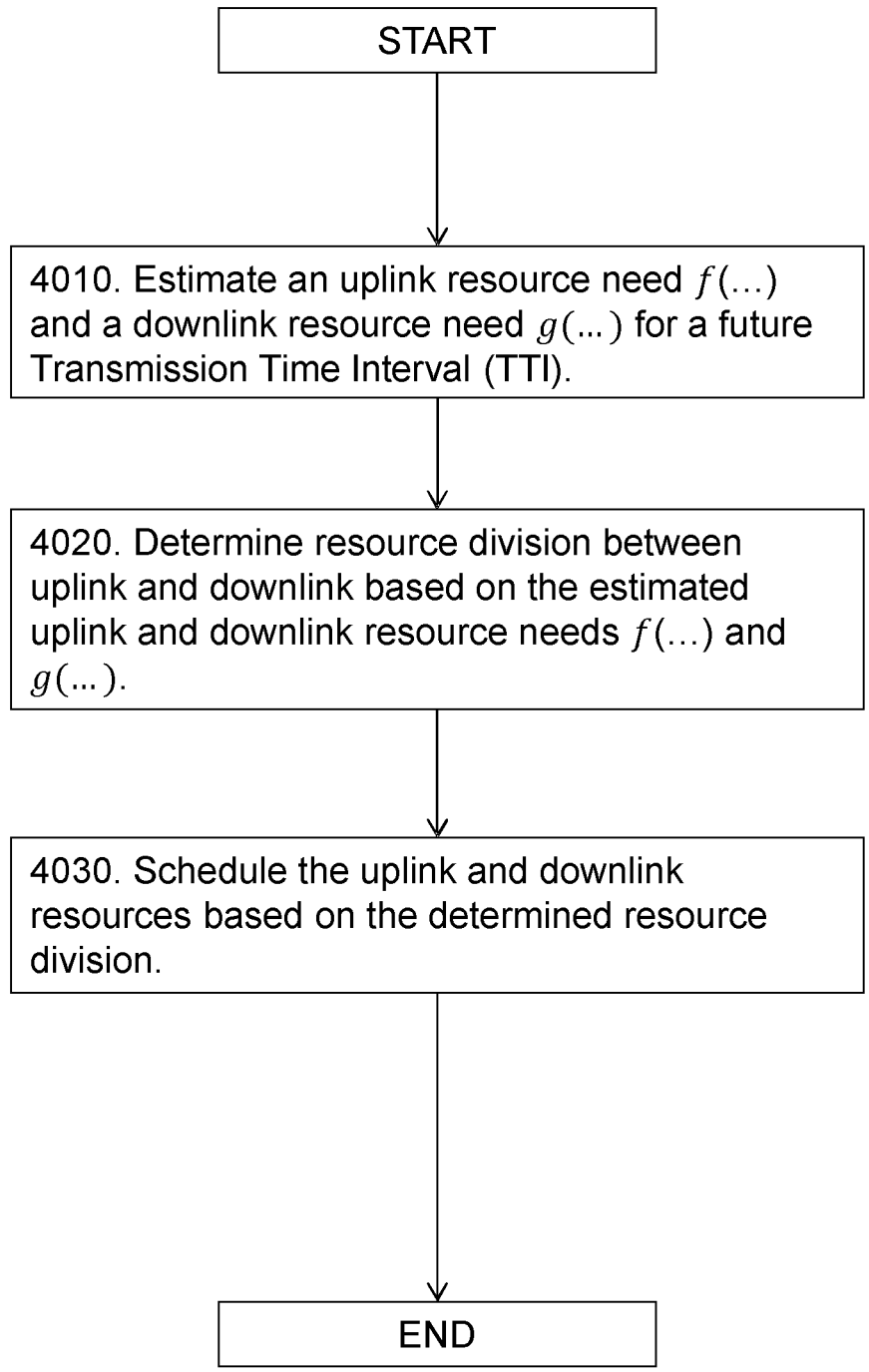
FIG. 4 is a flowchart depicting a method performed by a network node according to embodiments herein.
Figure 5:
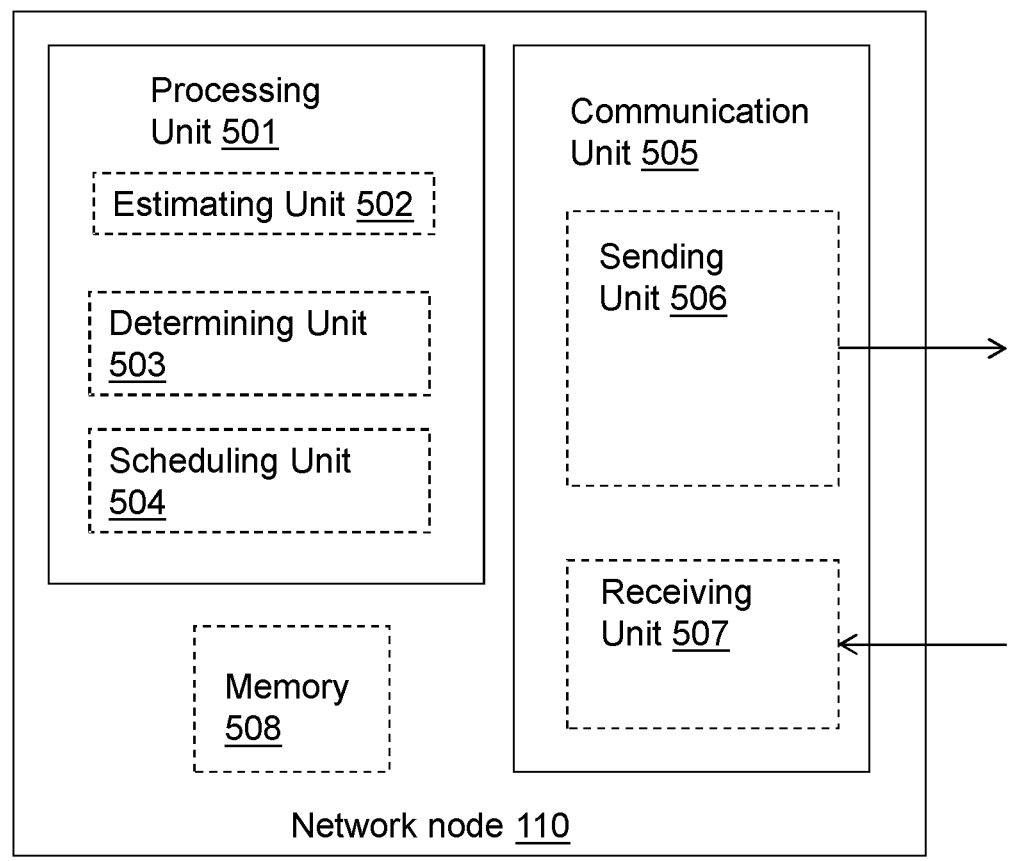
FIG. 5 is a schematic block diagram illustrating some first embodiments of the network node.
Figure 5:
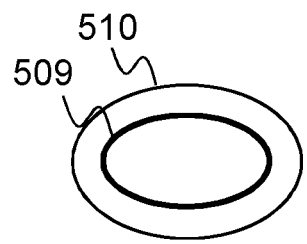

To perform the method actions for handling baseband resources in a wireless communications network 100, described above in relation to FIG. 4, the network node 110 may comprise the following arrangement as depicted in FIG. 5.

The network node 110 may comprise a processing unit 501, such as e.g. one or more processors, an estimating unit 502, a determining unit 503 and a scheduling unit 504 as exemplifying hardware units configured to perform the methods described herein. The network node 110 may further comprise a communication unit 505 for communicating with network devices, such as other network nodes 110, 111, 140 or the UE 120. The communication unit may comprise a sending unit 506 for sending information to network devices and a receiving unit 507 for receiving information from network devices.

The network node 110 is configured to, e.g. by means of the processing unit 501 and/or the estimating unit 502 being configured to, estimate the uplink resource need f( . . . ) and the downlink resource need g( . . . ) for the future TTI i based on resource metrics from one or more previous TTIs.

The network node 110 is configured to, e.g. by means of the processing unit 501 and/or the determining unit 503 being configured to, determine the resource division between uplink and downlink based on the estimated uplink and downlink resource needs.

The network node 110 is configured to, e.g. by means of the processing unit 501 and/or the scheduling unit 504 being configured to, schedule the uplink and downlink resources based on the determined resource division.

The network node 110 may be configured to, e.g. by means of the processing unit 501 and/or the determining unit 503 being configured to, determine the resource division based on an optimal uplink resource fraction of the available resources, $$N_i = \frac{f(...)}{f(...) + g(...)},$$

for a TTI i.

The network node 110 may be configured to, e.g. by means of the processing unit 501 and/or the determining unit 503 being configured to, determine the resource division by applying upper and lower restrictions to the optimal uplink resource fraction of the available resources.

The network node 110 may further be configured to, e.g. by means of the processing unit 501 and/or the determining unit 503 being configured to, determine the resource division by filtering the optimal uplink resource fraction $N_i$ to determine an actual resource allocation $M_i$ for the uplink.

The network node 110 may further be configured to, e.g. by means of the processing unit 501 and/or the determining unit 503 being configured to, determine the downlink resource fraction as the remaining resources once the uplink resource fraction has been subtracted.

The network node 110 may be configured to, e.g. by means of the processing unit 501 and/or the scheduling unit 504 being configured to, schedule the uplink using the actual resource allocation $M_i$ and the downlink is scheduled using remaining resources $1-M_i$.

The network node 110 may be configured to, e.g. by means of the processing unit 501, the determining unit 503 and/or the scheduling unit 504 being configured to, use the actual resource allocation $M_i$ as an upper limit for scheduling of the uplink, to determine an actual resource consumption $K_i$ of the uplink after the uplink has been scheduled, and to schedule the downlink using remaining resources $1-K_i$.

The network node 110 may further comprise a memory 508. The memory 508 comprises one or more memory units to be used to store data on, such as system information, configurations and/or applications to perform the methods disclosed herein when being executed, and similar.

Those skilled in the art will also appreciate that the estimating unit 502, the determining unit 503 and the scheduling unit 504 described above may refer to a combination of analog and digital circuits, and/or one or more processors configured with software and/or firmware, e.g. stored in the memory 508, that when executed by the one or more processors such as the processing unit 501 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as the processor 501 of a processing circuitry in the network node 110 depicted in FIG. 5, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

Figure 6:
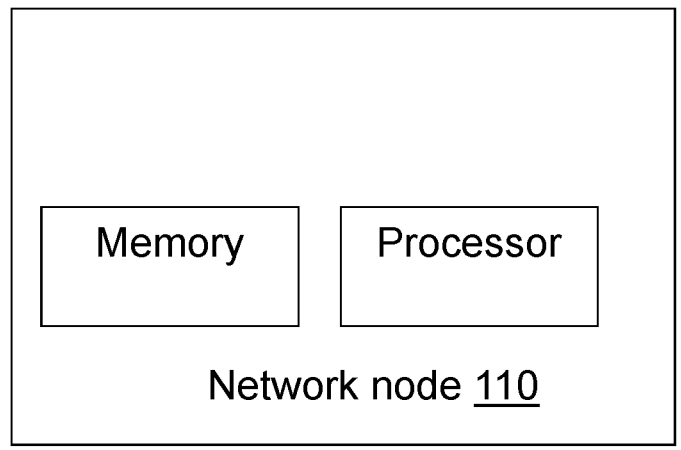
FIG. 6 is a schematic block diagram illustrating some second embodiments of the network node.
Figure 6:
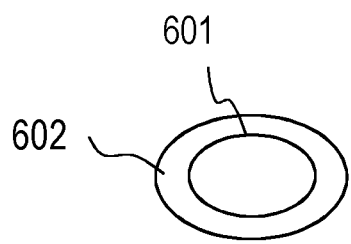

The embodiments herein for scheduling of a UE 120 in UL may be implemented through a respective processor or one or more processors of a processing circuitry in the network node 110 as depicted in FIG. 6, which processing circuitry is configured to perform the method actions according to FIG. 4 and the embodiments described above for the network node 110.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as e.g. a memory stick. The computer program code may furthermore be provided as pure program code on a server and downloaded to the network node 110.

The network node 110 may further comprise a memory. The memory may comprise one or more memory units to be used to store data on, such as the numbers determined to be related to a non-legitimate device, software, patches, system information (SI), configurations, diagnostic data, performance data and/or applications to perform the methods disclosed herein when being executed, and similar.

The method according to the embodiments described herein for the network node 110 may be implemented by means of e.g. a computer program product 509, 601 or a computer program, comprising instructions, i.e., software code portions, which, when executed on at least one processor, cause at least one processor to carry out the actions described herein, as performed by the UE 120. The computer program product 509, 601 may be stored on a computer-readable storage medium 510, 602, e.g. a disc or similar. The computer-readable storage medium 510, 602, having stored thereon the computer program, may comprise instructions which, when executed on at least one processor, cause the at least one processor to carry out the actions described herein, as performed by the network node 110. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the network node 110.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

When using the word "comprise" or "comprising" it shall be interpreted as non-limiting, i.e. meaning "consist at least of".

Further Extensions and Variations

Figure 7:
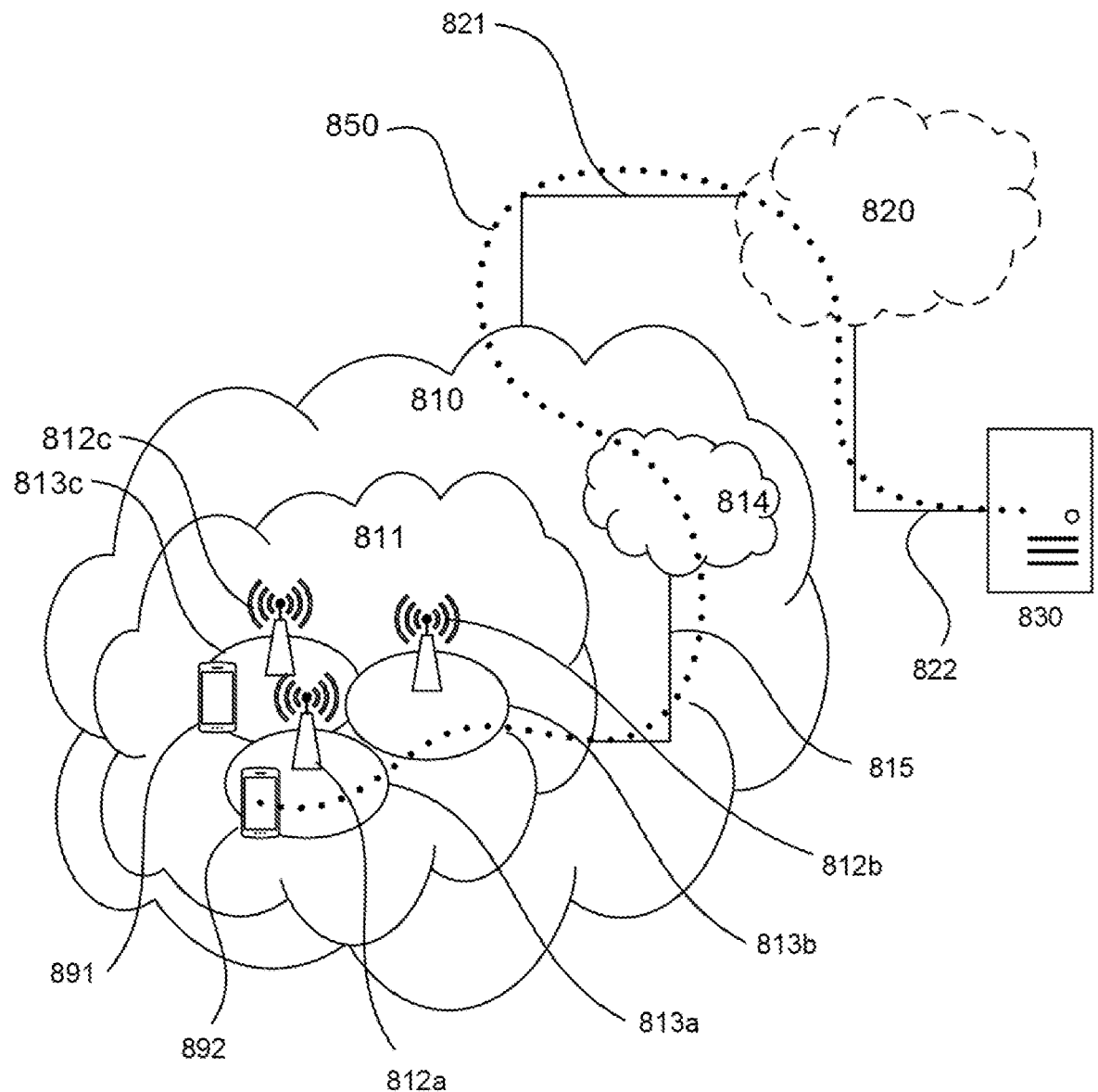
FIG. 7 is a schematic block diagram illustrating a host computer communicating via a base station with a user equipment over a partially wireless connection in accordance with some embodiments.

With reference to FIG. 7, in accordance with an embodiment, a communication system includes telecommunication network 810, such as a 3GPP-type cellular network, which comprises access network 811, such as a radio access network, and core network 814. Access network 811 comprises a plurality of base stations 812*a*, 812*b*, 812*c*, e.g. the network node 110, such as NBs, eNBs, gNBs or other types of wireless access points, each defining a corresponding coverage area 813*a*, 813*b*, 813*c*. Each base station 812*a*, 812*b*, 812*c* is connectable to core network 814 over a wired or wireless connection 815. A first UE 891, such as the UE 120, located in coverage area 813*c* is configured to wirelessly connect to, or be paged by, the corresponding base station 812*c*. A second UE 892 in coverage area 813*a* is wirelessly connectable to the corresponding base station 812*a*. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more subnetworks (not shown).

The communication system of FIG. 7 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink (UL) and downlink (DL) communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 8. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 8) served by base station 920. Communication interface 926 may be configured to facilitate connection 960 to host computer 910. Connection 960 may be direct or it may pass through a core network (not shown in FIG. 8) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

Figure 8:
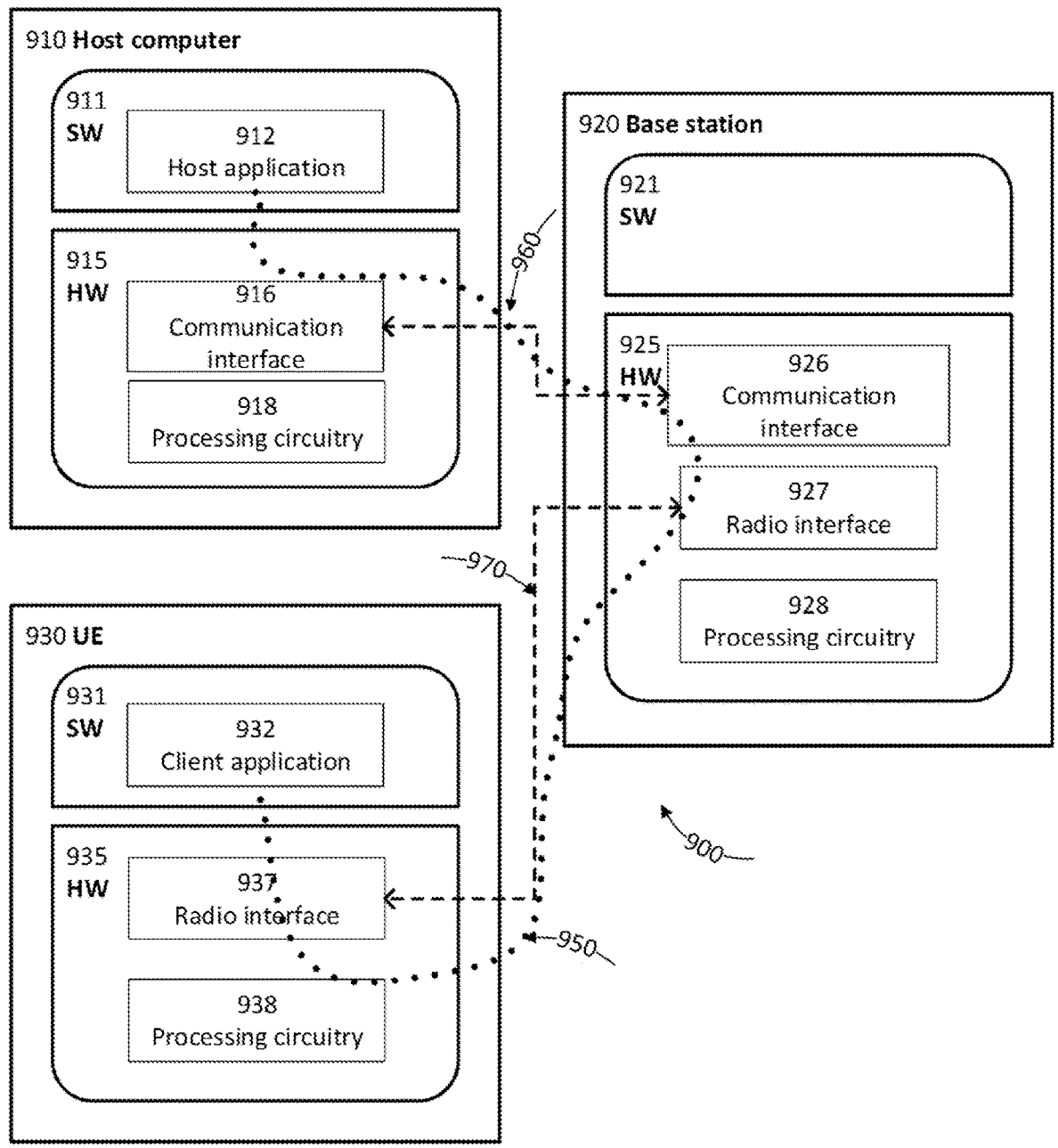
FIG. 8 is a schematic overview of a host computer communicating via a base station with a user equipment over a partially wireless connection in accordance with some embodiments.

It is noted that host computer 910, base station 920 and UE 930 illustrated in FIG. 8 may be similar or identical to host computer 830, one of base stations 812*a*, 812*b*, 812*c* and one of UEs 891, 892 of FIG. 7, respectively. This is to say, the inner workings of these entities may be as shown in FIG. 8 and independently, the surrounding network topology may be that of FIG. 7.

In FIG. 8, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, by dynamically adjusting the amounts of resources allowed for uplink and downlink respectively based on their needs while keeping the total amount of allowed resources fixed, the teachings of these embodiments may improve hardware utilization and thereby provide benefits such as data throughput in both uplink and downlink.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figures 9, 10:
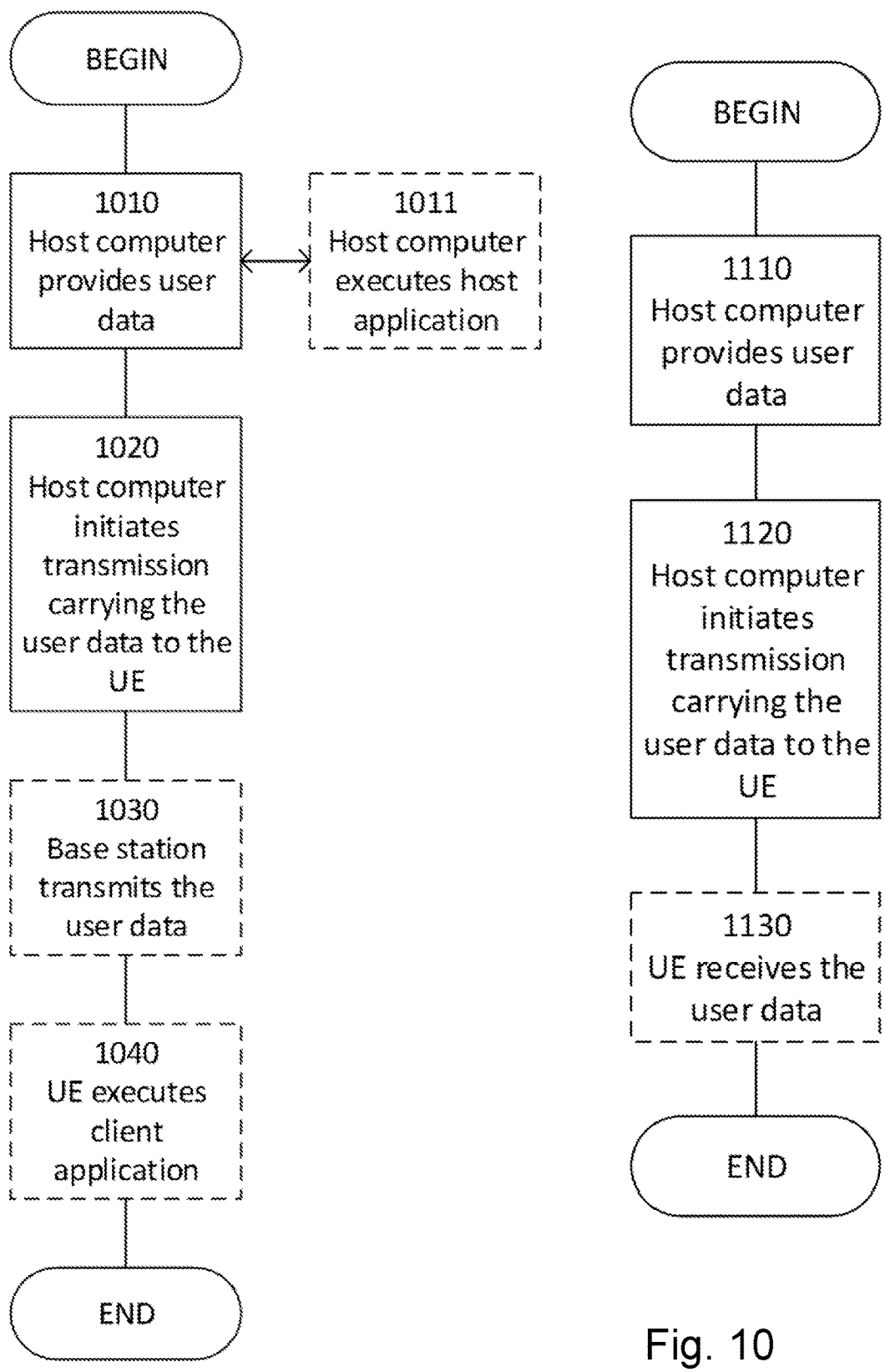
FIG. 9 is a flowchart depicting methods implemented in a communication system including a host computer, a base station and a user equipment in accordance with some embodiments.
FIG. 10 is a flowchart depicting methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figures 11, 12:
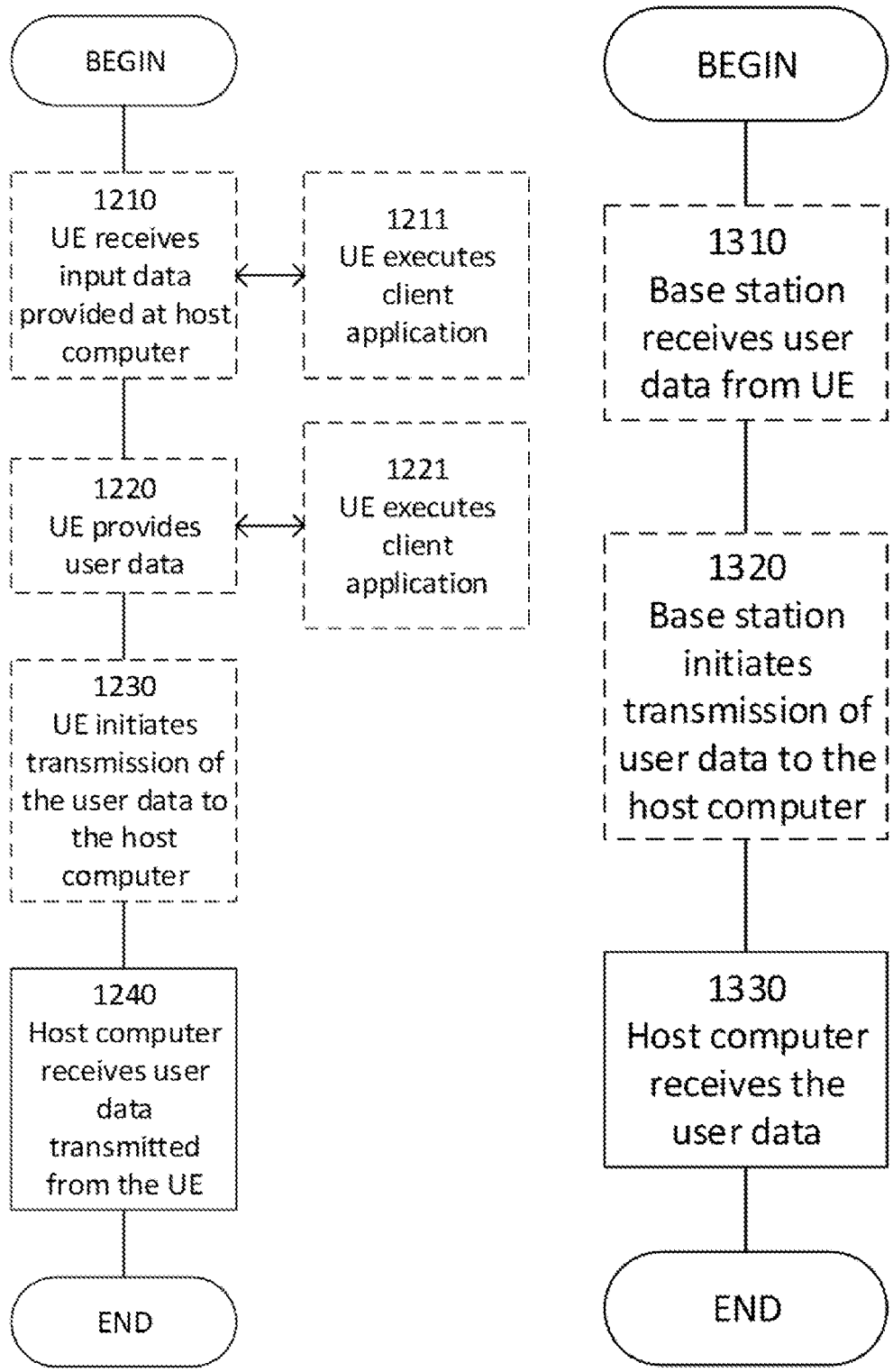
FIG. 11 is a flowchart depicting methods implemented in a communication system including a host computer, a base station and a user equipment in accordance with some embodiments.
FIG. 12 is a flowchart depicting methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method performed by a network node, for handling baseband resources in a wireless communications network, the method comprising:
    estimating an uplink resource need and a downlink resource need for a future Transmission Time Interval (TTI) i based on resource metrics from one or more previous TTIs;
    determining a resource division between uplink and downlink based on the estimated uplink and downlink resource needs; and
    scheduling the uplink and downlink resources based on the determined resource division, wherein
    the resource division is determined based on an optimal uplink resource fraction of the available resources, $$N_i = \frac{f(...)}{f(...) + g(...)},$$

for a TTI i, and
    the resource division is determined by filtering the optimal uplink resource fraction $N_i$ to determine a filtered resource fraction $M_i$ for the uplink.

2. The method of claim 1, wherein the resource division is further determined by applying upper and lower restrictions to the optimal uplink resource fraction of the available resources.

3. The method of claim 1, wherein a downlink resource fraction is determined as the remaining resources once the uplink resource fraction has been subtracted.

4. The method of claim 1, wherein the scheduling comprises scheduling the uplink using the filtered resource fraction $M_i$ and scheduling the downlink using remaining resources $1-M_i$.

5. The method of claim 1, wherein the scheduling comprises using the filtered resource fraction $M_i$ as an upper limit for scheduling of the uplink, wherein an actual resource consumption $K_i$ of the uplink is determined after the uplink has been scheduled, and wherein the downlink is scheduled using remaining resources $1-K_i$.

6. A network node, for handling baseband resources in a wireless communications network, the network node being configured to:
    estimate an uplink resource need and a downlink resource need for a future Transmission Time Interval (TTI) i based on resource metrics from one or more previous TTIs;
    determine a resource division between uplink and downlink based on the estimated uplink and downlink resource needs; and
    schedule the uplink and downlink resources based on the determined resource division, wherein
    the resource division is determined based on an optimal uplink resource fraction of the available resources, $$N_i = \frac{f(...)}{f(...) + g(...)},$$

for a TTI i, and
    the resource division is determined by filtering the optimal uplink resource fraction $N_i$ to determine a filtered resource fraction $M_i$ for the uplink.

7. The network node of claim 6, wherein the network node is further configured to determine the resource division by applying upper and lower restrictions to the optimal uplink resource fraction of the available resources.

8. The network node of claim 6, wherein the network node is further configured to determine a downlink resource fraction as the remaining resources once the uplink resource fraction has been subtracted.

9. The network node of claim 6, wherein the network node is further configured to schedule the uplink using the filtered resource fraction $M_i$ and the downlink is scheduled using remaining resources $1-M_i$.

10. The network node of claim 6, wherein the network node is further configured to use the filtered resource fraction $M_i$ as an upper limit for scheduling of the uplink, to determine an actual resource consumption $K_i$ of the uplink after the uplink has been scheduled, and to schedule the downlink using remaining resources $1-K_i$.

11. A non-transitory computer readable medium storing a computer program comprising instructions that when executed by a processor of an apparatus, causes the apparatus to perform the method of claim 1.

12. The method of claim 1, wherein estimating the uplink (UL) resource need for the future TTI comprises:
    determining a first UL resource need for a first previous TTI;
    determining a second UL resource need for a second previous TTI;
    determining a difference between the first UL resource need and the second UL resource need; and
    estimating the uplink resource need for the future TTI using the determined difference.

* * * * *